United States Patent
Ihara et al.

(10) Patent No.: US 7,674,541 B2
(45) Date of Patent: Mar. 9, 2010

(54) HYDROGEN GAS SUPPLY DEVICE AND FUEL CELL APPARATUS

(75) Inventors: Shoji Ihara, Yokohama (JP); Shuji Aoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 12/063,945

(22) PCT Filed: Sep. 11, 2006

(86) PCT No.: PCT/JP2006/318444

§ 371 (c)(1),
(2), (4) Date: Feb. 15, 2008

(87) PCT Pub. No.: WO2007/032507

PCT Pub. Date: Mar. 22, 2007

(65) Prior Publication Data

US 2009/0269633 A1    Oct. 29, 2009

(30) Foreign Application Priority Data

Sep. 13, 2005    (JP) .............................. 2005-265791

(51) Int. Cl.
*F17C 11/00* (2006.01)
*H01M 8/04* (2006.01)

(52) U.S. Cl. .............................. 429/22; 96/109; 96/133
(58) Field of Classification Search .................. 96/109, 96/112–114, 121, 133; 420/900; 423/248, 423/648.1, 658.2; 206/0.7; 429/22, 24, 25
See application file for complete search history.

(56) References Cited

U.S. PATENT DOCUMENTS

| 4,211,537 | A | 7/1980 | Teitel |
| 6,057,051 | A | 5/2000 | Uchida et al. |
| 6,777,118 | B2 | 8/2004 | Shioya |
| 6,824,905 | B2 | 11/2004 | Shioya et al. |
| 6,899,855 | B2 * | 5/2005 | Shimada ...................... 422/198 |
| 6,916,565 | B2 | 7/2005 | Shioya |
| 7,416,800 | B2 * | 8/2008 | Benson et al. ................ 429/20 |
| 2005/0069746 | A1 | 3/2005 | Kabasawa |
| 2005/0233189 | A1 | 10/2005 | Shioya |
| 2007/0111062 | A1 * | 5/2007 | Yamamoto ................... 429/25 |

FOREIGN PATENT DOCUMENTS

JP    5-106513  A    4/1993

(Continued)

*Primary Examiner*—Frank M Lawrence
(74) *Attorney, Agent, or Firm*—Fitzpatrick, Cella, Harper & Scinto

(57) ABSTRACT

The hydrogen gas supply device capable of detecting that the hydrogen gas storage volume of a tank has decreased to a predetermined value or less including a plurality of tanks each filled with a hydrogen storage alloy, an information obtaining device for obtaining information on the physical quantity of the plurality of tanks different from each other in hydrogen storage volume, and a signal outputting device for outputting information signal on the remaining amount of the hydrogen gas in the tanks by determining a hydrogen gas storage status of the plurality of tanks from information on the physical quantity, and detecting the decrease of the remaining amount of the hydrogen gas in all tanks in use to a predetermined value or less from the hydrogen gas storage status of the plurality of tanks.

7 Claims, 12 Drawing Sheets

FOREIGN PATENT DOCUMENTS

| | | |
|---|---|---|
| JP | 7-101255 A | 4/1995 |
| JP | 9-213359 A | 8/1997 |
| JP | 10-252567 A | 9/1998 |
| JP | 2001-295996 A | 10/2001 |
| JP | 2002-252014 A | 9/2002 |
| JP | 2002-333100 A | 11/2002 |
| JP | 2005-98838 A | 4/2005 |

* cited by examiner

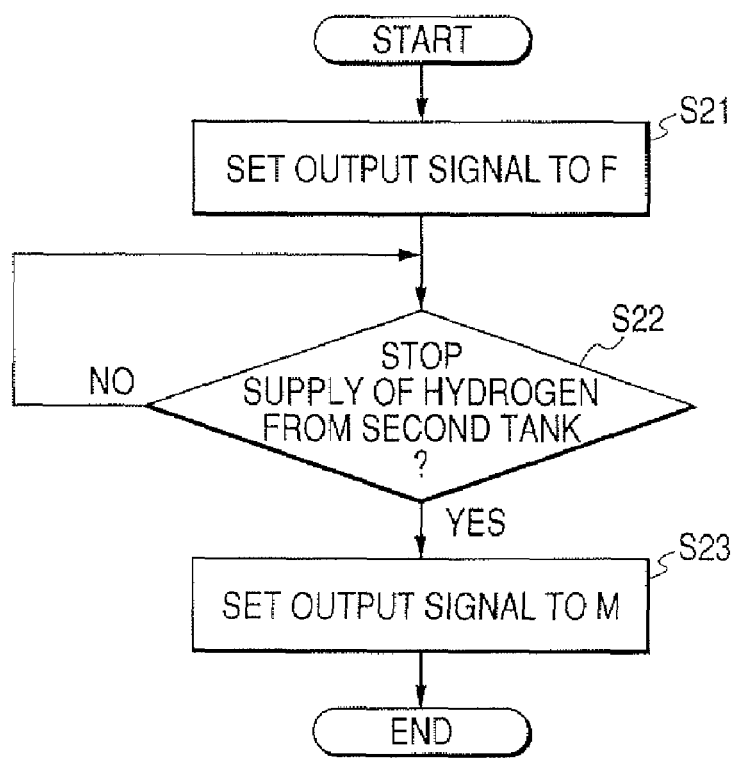

HYDROGEN GAS SUPPLY DEVICE AND FUEL CELL APPARATUS

TECHNICAL FIELD

The present invention relates to a hydrogen gas supply device, which supplies hydrogen gas stored in a tank. Specifically, it is related to a hydrogen gas supply device capable of detecting that the remaining amount of the hydrogen gas is at a predetermined value or less and to a fuel cell apparatus using the same.

BACKGROUND ART

Fuel cells have been extensively studied and developed to prevent global warming and solve energy problems in recent years. Hydrogen has attracted attention as a fuel for a fuel cell, and the development of a hydrogen application technique, such as its storage and a supply device, is also an important issue in spreading the applicability of fuel cells.

A polymer electrolyte fuel cell using hydrogen as a fuel, which can be mounted as a power supply for electric instruments, such as a notebook type computer, is disclosed by Japanese Patent Laid-Open Application No. H09-213359.

For a portable fuel cell, a hydrogen tank filled with a hydrogen storage alloy has been widely used to store hydrogen as the fuel.

Detection of the remaining amount of the fuel is a very important issue when a fuel cell is used. When liquid fuel, such as methanol, is used as the fuel, a part of the fuel tank may be transparent to visually check the remaining amount of the fuel. When hydrogen is used as the fuel and a hydrogen tank is filled with hydrogen, however, the remaining amount of the fuel cannot be visually checked.

In a fuel cell using hydrogen as the fuel, Japanese Patent Laid-Open Application No. 2002-252014 discloses a method of detecting a decrease in the remaining amount of the fuel by detecting a reduction in the output voltage of the fuel cell.

Furthermore, Japanese Patent Application Laid-Open No. 2001-295996 discloses a hydrogen gas supply device in which hydrogen is stored in a plurality of hydrogen storage tanks containing a hydrogen storage alloy. The pressure of one hydrogen storage tank is detected to sequentially switch from one hydrogen storage tank to another at the time this tank stops supplying hydrogen. A method of determining the remaining amount of the fuel based upon the number of hydrogen storage tanks that have stopped supplying hydrogen is also disclosed.

As a method of measuring the remaining amount of a fuel without a visual check in the case of using a liquid fuel is used, Japanese Patent Laid-Open Application No. 2005-98838 discloses a device for measuring the remaining amount of the fuel in which a plurality of liquid chambers are provided in a fuel tank, and the remaining amount of the fuel in each liquid chamber is detected to measure the remaining amount independent of the attitude of the fuel tank.

Hydrogen stored in a hydrogen storage alloy is generally released at a nearly constant release pressure until the remaining amount of hydrogen in the hydrogen storage alloy reaches a predetermined value. When the remaining amount of hydrogen is reduced to the predetermined value or less, the release pressure suddenly drops to stop the release of hydrogen. When the hydrogen fuel of a fuel cell is stored in a hydrogen fuel tank using a hydrogen storage alloy, only a very small amount of hydrogen is released from the hydrogen fuel tank after the output voltage of the fuel cell has been decreased due to a decrease in hydrogen release pressure from the hydrogen fuel tank.

When the remaining amount of hydrogen is detected by the method described in Japanese Patent Application Laid-Open No. 2002-252014, immediately before the fuel is exhausted, firstly the remaining amount of hydrogen is merely recognized to be small. Thus, the method cannot detect a predetermined remaining amount (for example, 50%, 10% and the like of the remaining amount of the total hydrogen storage amount), so that it is insufficient as a method of detecting the remaining amount in the fuel cell.

The method disclosed by Japanese Patent Application Laid-Open No. 2001-295996 requires that an on/off valve for supplying hydrogen be attached to each of a plurality of hydrogen storage tanks. As soon as one hydrogen storage tank finishes supplying hydrogen, the on/off valve is promptly manipulated to switch to another hydrogen storage tank to supply hydrogen. This causes a problem in that a device is enlarged on account of attaching the on/off valves and of automatically manipulating the on/off valves, thereby increasing the production cost of the device. The hydrogen storage tank for supplying hydrogen is switched at the same time when the hydrogen release pressure from the hydrogen fuel tank is decreased. However, a hydrogen supply amount (i.e., hydrogen release pressure) may momentarily drop when the hydrogen storage tank is switched. This produces a problem in that the use of the hydrogen supply device in combination with other devices, such as a fuel cell, makes the hydrogen supply amount unstable.

Japanese Patent Application Laid-Open No. 2005-98838 discloses a method of detecting the remaining amount of a fuel when a liquid fuel is used as the fuel. This method does not at all take into consideration the detection of the remaining amount of hydrogen in a hydrogen storage alloy. For this reason, such a method cannot be used for the detection of the remaining amount in the hydrogen storage tank using a hydrogen storage alloy.

DISCLOSURE OF THE INVENTION

The present invention is directed to a hydrogen gas supply device capable of detecting that the storage volume of a hydrogen gas in a tank falls to a predetermined value or less and to a fuel cell apparatus using the device.

That is to say, the present invention provides a hydrogen gas supply device including: a plurality of tanks each filled with a hydrogen storage alloy for storing a hydrogen gas, at least one tank of the plurality of tanks being different from the other tanks in a hydrogen gas storage volume; an information obtaining device for obtaining information on a physical quantity of the plurality of tanks including tanks different from each other in the hydrogen storage volume; and a signal outputting device for outputting an information signal on the remaining amount of a hydrogen gas in the tank by determining the hydrogen gas storage status of the plurality of tanks from the information on the physical quantity, and detecting the decrease of the remaining amount of the hydrogen gas in all tanks in use to a predetermined value or less from the hydrogen gas storage status of the plurality of tanks.

It is preferable to detect a reduction in the remaining amount of hydrogen gas in all tanks to a predetermined value or less from a difference between a physical quantity of one tank having a small hydrogen gas storage volume and each physical quantity of the other tanks among the plurality of tanks.

It is preferable that the information on the physical quantity be information on at least one selected from the group consisting of a tank temperature, a pressure inside the tank, and electric conductivity inside the tank.

It is preferable that a detecting device for detecting it be detachably provided on the tank.

It is preferable that the detecting device be integrally provided on the tank.

In another aspect of the present invention, there is provided a hydrogen gas supply device including: a plurality of tanks each filled with a hydrogen storage alloy for storing a hydrogen gas, at least one tank of the plurality of tanks having the same hydrogen gas storage volume being connected to a downstream storage tank having a hydrogen gas storage volume smaller than that of the at least one tank; an information obtaining device for obtaining information on a physical quantity of the plurality of tanks including the at least one tank connected to the downstream storage tank having a hydrogen gas storage volume smaller than that of the at least one tank and a tank not connected the downstream tank; and a signal outputting device for outputting information signal on the remaining amount of the hydrogen gas in the tank by determining a hydrogen gas storage status from information on the physical quantity, and detecting the decrease of the remaining amount of the hydrogen gas in all tanks in use to a predetermined value or less from the hydrogen gas storage status of the plurality of tanks.

It is preferable to detect that the remaining amount of hydrogen gas in all tanks falls to a predetermined value or less from a difference between a physical quantity of one tank having a small hydrogen gas storage volume and each physical quantity of the other tanks among the plurality of tanks.

It is preferable that the information on the physical quantity be information on at least one selected from the group consisting of a tank temperature, a pressure inside the tank, and electric conductivity inside the tank.

It is preferable that a detecting device for detecting the physical quantity be detachably provided on the tank.

It is preferable that the detecting device be integrally provided on the tank.

Furthermore, the present invention provides a fuel cell apparatus including the foregoing hydrogen gas supply device and a fuel cell for generating an electric power by suing a hydrogen gas supplied from the hydrogen gas supply device as a fuel.

BRIEF DESCRIPTION OF THE DRAWINGS

FIG. 12 is a flow chart for describing the operation of a control device in the fourth embodiment according to the present invention.

BEST MODE FOR CARRYING OUT THE INVENTION

Figure 1:
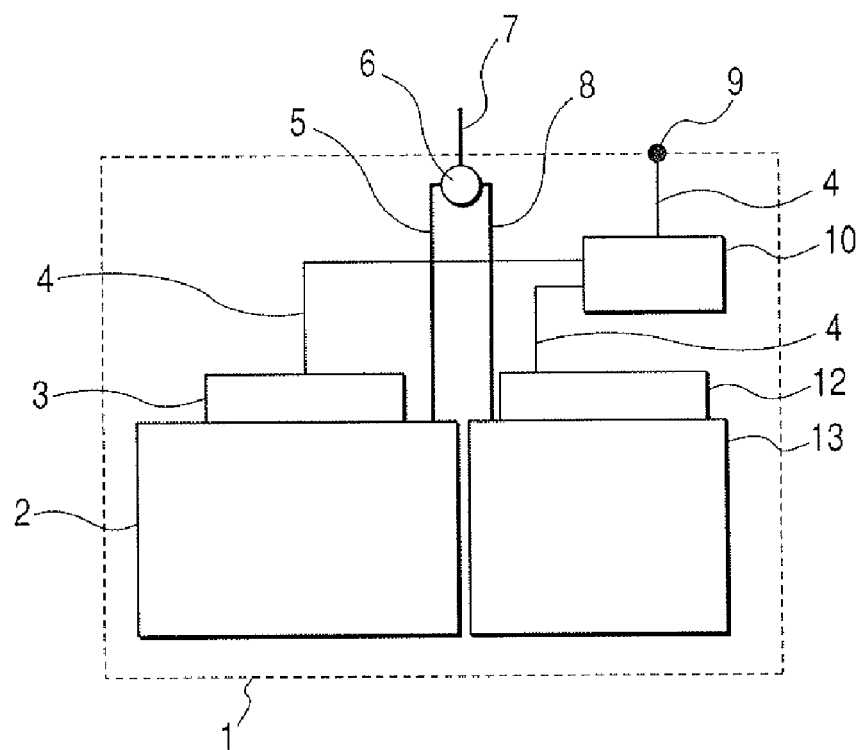
FIG. 1 is a block diagram showing the constitution of a hydrogen gas supply device in a first embodiment according to the present invention.

The present invention will be described in detail in the following.

The hydrogen gas supply device of the present invention is capable of detecting reliably that a hydrogen gas storage volume in the tank falls to a predetermined value or less even when a hydrogen storage alloy is used.

The hydrogen gas supply device of the present invention includes: a plurality of tanks each filled with a hydrogen storage alloy for storing a hydrogen gas, at least one tank of the plurality of tanks being different from the other tanks in a hydrogen gas storage volume; an information obtaining device for obtaining information on the physical quantity of the plurality of tanks including tanks different from each other in the hydrogen storage volume; and a signal outputting device for outputting an information signal on the remaining amount of the hydrogen gas in the tank by determining a hydrogen gas storage status in the plurality of tanks from the information on the physical quantity, and detecting that the remaining amount of hydrogen gas in all tanks in use falls to a predetermined value or less from the hydrogen gas storage status of the plurality of tanks.

For example, hydrogen gas is simultaneously supplied from a plurality of tanks having different hydrogen gas storage volumes. By detecting the physical quantity concerning the tank having a small hydrogen gas storage volume, it is detected that the tank having a small hydrogen gas storage volume becomes empty, thereby detecting that the remaining amount in the other tanks becomes smaller.

A second hydrogen gas supply device according to the present invention includes: a plurality of tanks each filled with a hydrogen storage alloy for storing a hydrogen gas, at least one tank of the plurality of tanks having the same hydrogen gas storage volume being connected to a downstream storage tank having a hydrogen storage volume smaller than that of the at least one tank; an information obtaining device for obtaining information on the physical quantity of the plurality of tanks including at least one tank connected to the downstream storage tank having a hydrogen gas storage volume smaller than a hydrogen gas storage volume of the at least one tank and a tank not connected to the downstream tank; and a signal outputting device for outputting an information signal on the remaining amount of a hydrogen gas in the tanks by determining a hydrogen gas storage status from the information on the physical quantity, and detecting that the remaining amount of hydrogen gas in all tanks in use falls to a predetermined value or less from the hydrogen gas storage status of the plurality of tanks.

For example, in a hydrogen gas supply device having a plurality of tanks having the same hydrogen gas storage volume and a storage tank connected to only some of the plurality of tanks, the storage tank having a small hydrogen storage volume, the device determines that hydrogen in the tank out of the plurality of tanks having the same hydrogen gas storage volume, connected to the storage tank, is exhausted based on the physical quantity of the tank connected to the storage tank, thereby detecting that the remaining amount of the hydrogen gas in the other tanks becomes smaller.

Furthermore, the fuel cell apparatus according to the present invention includes a fuel cell for generating an electric power by using hydrogen gas as a fuel and the above-described hydrogen gas supply device.

The present invention is described further in detail below, but it is not limited to the following embodiments.

Embodiment 1

One embodiment of the present invention will be described below with reference to the drawings. FIG. 1 is a block diagram illustrating the constitution of a hydrogen gas supply device in a first embodiment according to the present invention. In the figure, reference numeral 1 denotes a hydrogen gas supply device, which is composed of two tanks for storing hydrogen (a first tank 2 and a second tank 13), and other attachments shown below. Each tank is filled with a hydrogen storage alloy and is capable of efficiently storing a large amount of hydrogen. Any hydrogen storage alloy that will absorb and release hydrogen may be used as the hydrogen storage alloy in the present embodiment. For instance, $AB_5$-based materials, such as $LaNi_5$, $MmNi_5$, and $CaNi_5$, $AB_2$-based materials, such as $TiMn_{1.5}$, AB-based materials, such as TiFe, and BCC-based materials, such as $Ti_{10}V_{14.5}Cr_{12.5}Mn_3$, can be used.

Hydrogen is released at the same pressure when it is stored in two tanks. The tanks are different from each other in the amount of hydrogen they are capable of storing. Hydrogen storage volumes of a first and a second tank are taken as V1 and V2 respectively, where V1 is greater than V2. Hydrogen storage volume refers to the amount of hydrogen gas to be withdrawn from a tank and excludes hydrogen bonded to hydrogen storage alloy not to be released therefrom under the condition that it is used in the hydrogen gas supply device. Such two tanks can be more easily realized by filling two tanks different in size with the same hydrogen storage alloy at the same filling density. However, any other method in addition to the above may be used to provide the above two tanks by changing the filling amount of hydrogen storage alloy, kinds of hydrogen storage alloy to be used, and the filling amount of hydrogen, only if the two tanks release hydrogen at the same pressure and are different from each other in hydrogen storage volume.

Hydrogen in each tank passes through gas supplying tubes 5 and 8 and is combined into one hydrogen gas stream in the mixer 6. Then, hydrogen is supplied from a gas supply tube 7 to other devices (not shown), for example, to a power generating cell part in a fuel cell.

Figure 3:
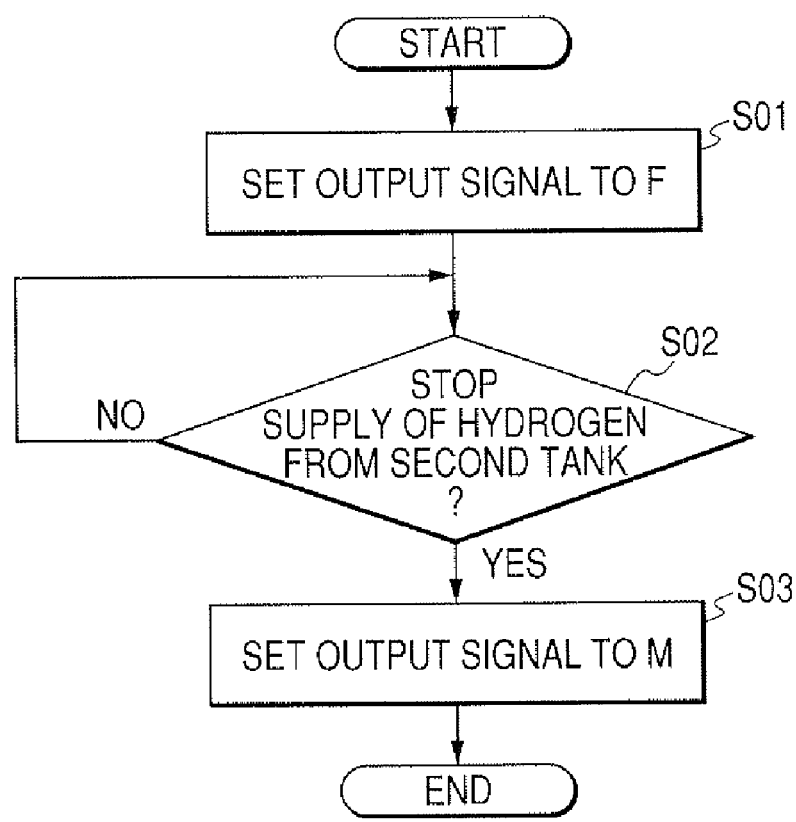
FIG. 3 is a flow chart for describing the process of a control device in the first embodiment according to the present invention.

Reference numeral 3 denotes a first sensor, which is a detecting device for detecting the physical quantity of the first tank 2. Reference numeral 12 denotes a second sensor, which is a detecting device for detecting the physical quantity of the second tank 13. It is detected from the physical quantity of the first and the second tank 2 and 13 whether or not hydrogen is supplied from the tank (or hydrogen supply status). The signal detected by each sensor is sent to a control device 10 through a signal line 4. The control device 10 determines a hydrogen remaining status based on the signal from each sensor and outputs a signal from a signal terminal 9 according to the status. A process for determining the remaining amount of hydrogen by the control device 10 is stated in detail when FIG. 3 is described.

Methods of detecting the hydrogen supply status of the tanks 2 and 13 by the sensors 3 and 12 include a method of detecting a physical quantity, such as the temperature of hydrogen storage alloy changed by release of hydrogen in the tank, the pressure, and electric conductivity inside the tank, and a method of detecting the change rate per time of these physical quantities. Any other detecting method may be used as long as it can be used to at least detect that hydrogen in the tank is released and the hydrogen supply is stopped. It is not always required that the absolute amount or relative amount of hydrogen left in the tank can be detected.

Since the control device 10 determines that hydrogen is no longer supplied from one hydrogen tank based upon the difference in output between the sensors 3 and 12, the control device 10 is capable of precisely detecting the complete release of hydrogen in the tank with influences, such as ambient temperature and other external environment, being minimized.

Figure 2:
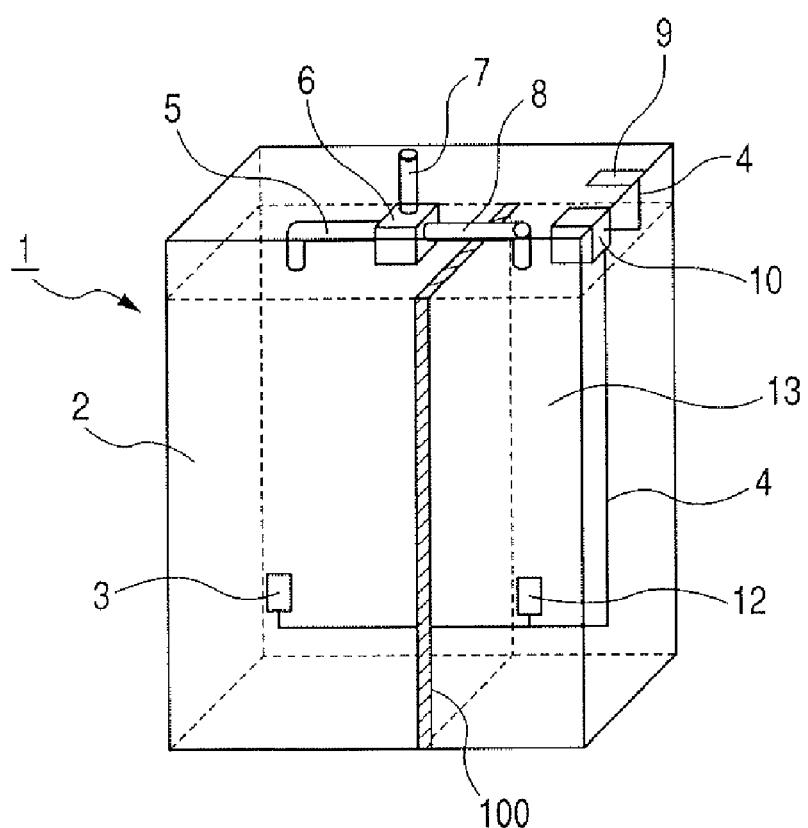
FIG. 2 is a schematic perspective view for describing the appearance of the hydrogen gas supply device in the first embodiment according to the present invention.

FIG. 2 is a schematic perspective view for describing the appearance of the hydrogen gas supply device in the first embodiment according to the present invention. The same constitutional elements as those in FIG. 1 are given the same reference numerals to omit duplicated descriptions thereof. As shown in the figure, a first tank and a second tank in the hydrogen gas supply device are formed by separating one large tank into two compartments with an inner partition 100. Incidentally, the inner partition 100 also serves to maintain the strength of the tank, thereby minimizing the increase in manufacturing cost of the fuel tank.

FIG. 3 is a flow chart for describing the process of the control device in the first embodiment. The tanks 2 and 13 of the hydrogen gas supply device are filled with hydrogen in advance. When the hydrogen gas supply device starts to be used, the control device 10 outputs a signal "F" indicating that the remaining amount of hydrogen in the hydrogen gas supply device is sufficient from the signal terminal 9 (Step S01). In the next place, the control device determines a hydrogen supply status of each tank based on the value of each sensor (Step S02). When hydrogen in the hydrogen gas supply device continues to be used, hydrogen in the second tank smaller in hydrogen storage volume than the first tank is the first to be exhausted. When the remaining amount of hydrogen in the second tank is reduced to zero to stop supplying hydrogen (in the case of "YES"), the output signal from the signal terminal 9 is changed to "M," signifying that the remaining amount of hydrogen has fallen to a predetermined value or less (Step S03).

When the output signal is changed to "M," the remaining amount of hydrogen in the hydrogen gas supply device is expressed by the following equation:

$$V = V1 - V2,$$

which means that the remaining amount of hydrogen is equal to V1−V2 or less. Thus, the hydrogen storage volumes of two tanks are adjusted so that the output signal is changed from "F" to "M" when the remaining amount of hydrogen falls to a desired value or less, thereby making it possible to detect the decrease of the remaining amount of hydrogen to the desired value or less.

For instance, in order to detect that the remaining amount of hydrogen falls to 10% or less of the hydrogen storage volume in the hydrogen gas supply device, the hydrogen storage volume V2 of the second tank may be set to 82% of the hydrogen storage volume V1 of the first tank as follows:

$$V2=0.82 \times V1.$$

At this point, the ratio "r" of the remaining amount of hydrogen (i.e., the ratio of the remaining amount of hydrogen to the total hydrogen storage volume in the hydrogen gas supply device) at the time of changing the output signal from "F" to "M" is represented by the following equation:

$$r=(V1-V2)/(V1+V2)=(V1-0.82V1)/(V1+0.82V1)=0.1.$$

Thus, when the remaining amount of hydrogen is equal to 10% of the total hydrogen storage volume, the output signal is changed to "M".

Embodiment 2

In the first embodiment, the described hydrogen gas supply device is capable of detecting whether or not the remaining amount of hydrogen has been reduced to a desired value or less in a single step by using two tanks different in storage volume. The present invention also involves a hydrogen gas supply device for separating a detection process into a plurality of steps to detect the remaining amount of hydrogen. As an example, a hydrogen gas supply device for detecting the remaining amount of hydrogen in two steps is shown as a second embodiment.

Figure 4:
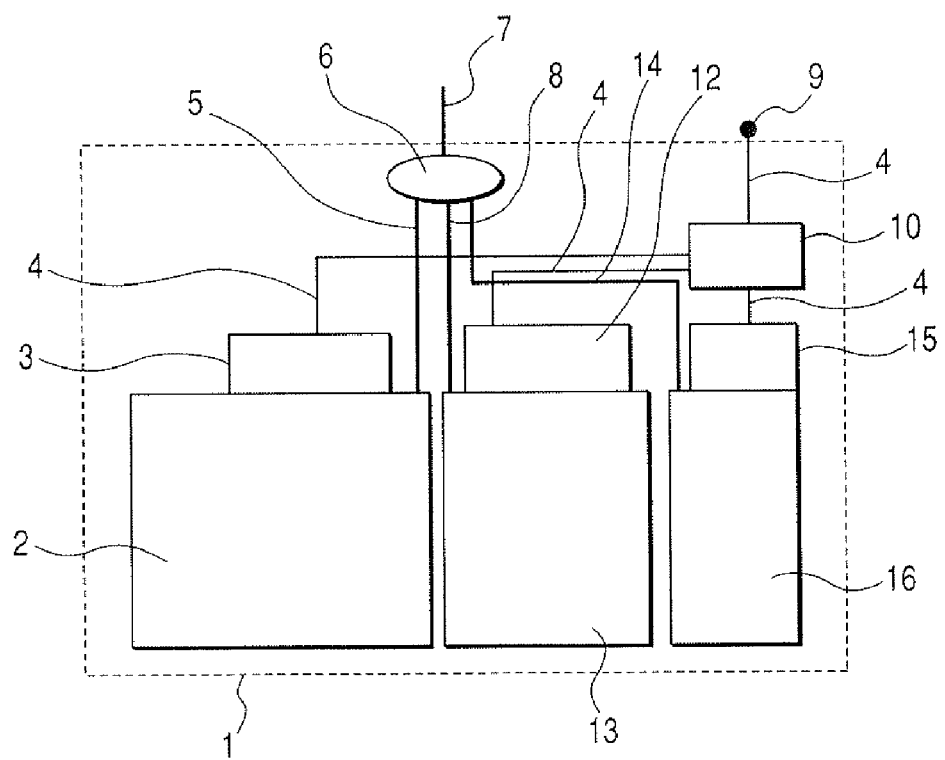
FIG. 4 is a block diagram showing the constitution of a hydrogen gas supply device in a second embodiment according to the present invention.

FIG. 4 is a block diagram showing the constitution of a hydrogen gas supply device in the second embodiment according to the present invention. In the figure, the same constitutional elements as those in the first embodiment are given the same reference numerals to omit duplicated descriptions thereof. In the present embodiment, the hydrogen gas supply device is composed of three tanks. Reference numeral 16 denotes a third tank and 15 denotes a third sensor for detecting the hydrogen gas supply status of the third tank. Incidentally, the hydrogen storage volumes of the first, the second, and the third tank are taken to be V1, V2 and V3, respectively, where V1>V2>V3. The hydrogen storage volumes V1, V2, and V3 are discussed in detail when FIG. 5 is described.

Figure 5:
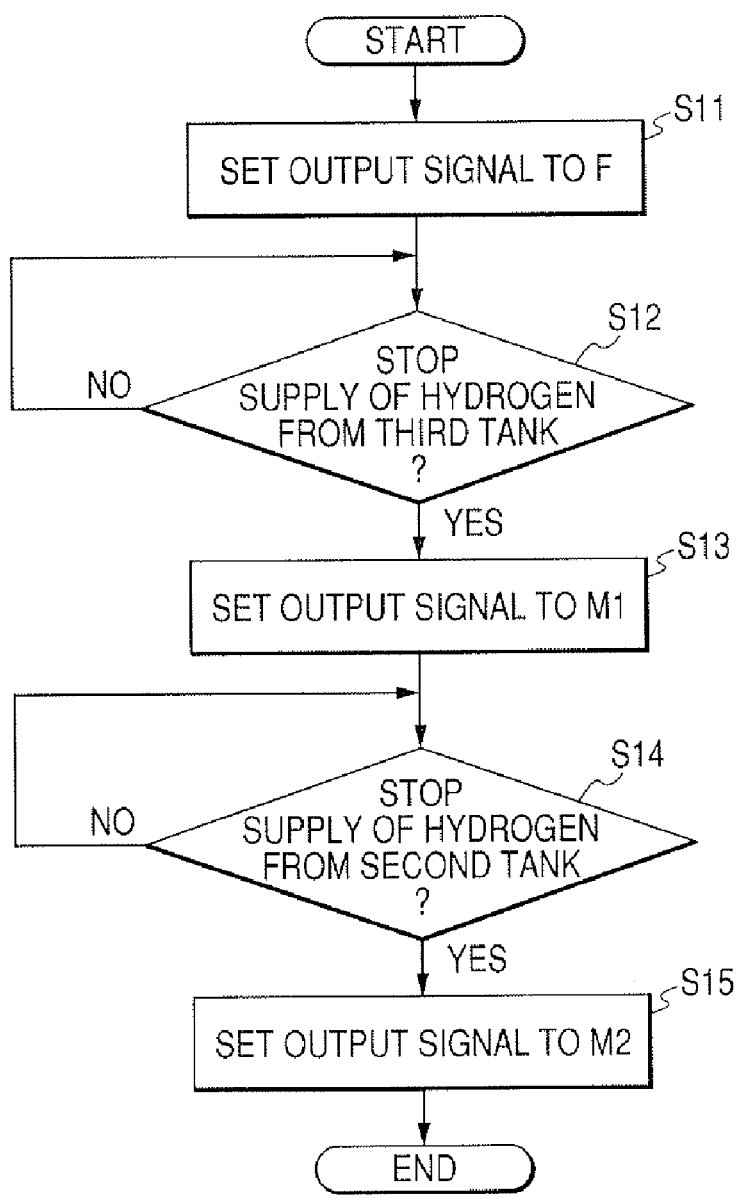
FIG. 5 is a flow chart for describing the process of a control device in the second embodiment according to the present invention.

FIG. 5 is a flow chart for describing the process of a control device 10 in the second embodiment. The tanks 2, 13, and 16 of the hydrogen gas supply device are filled with hydrogen in advance. When the hydrogen gas supply device starts to be used, the control device 10 outputs a signal "F" indicating that the remaining amount of hydrogen in the hydrogen gas supply device is sufficient to the signal terminal 9 (Step S11). Next, the control device determines the hydrogen gas supply status of the third tank based on the value of each sensor (Step S12). Since the hydrogen storage volumes of the tanks V1, V2, and V3 become smaller in this order (i.e., V1>V2>V3), when the hydrogen gas supply device continues to use hydrogen, hydrogen in the third tank having the smallest hydrogen gas storage volume is exhausted first. When the remaining amount of hydrogen in the third tank is reduced to zero to stop supplying hydrogen (in the case of "YES"), the output signal from the signal terminal 9 is changed to "M1" signifying that the remaining amount of hydrogen falls to a first predetermined value or less (Step S13).

When the output signal is changed to "M1," the remaining amount V of hydrogen in the storage device is represented by the following equation:

$$V=V1+V2-2V3.$$

Subsequently, the control device 10 determines the hydrogen gas supply status of the second tank based on the value of each sensor (Step S14). When hydrogen in the hydrogen gas supply device further continues to be used and the remaining amount of hydrogen in the second tank is reduced to zero, thereby stopping the hydrogen supply (in the case of "YES"), the output signal from the signal terminal 9 is changed to "M2" signifying that the remaining amount of hydrogen has been reduced to a second predetermined value or less (Step S15). When the output signal is changed to "M2," the remaining amount V of hydrogen in the hydrogen gas supply device is expressed by the following equation:

$$V=V1-V2.$$

If the check is made when the remaining amount of hydrogen falls to 50% (the first predetermined value) and 10% (the second predetermined value) of the total storage volume in the entire hydrogen gas supply device, the hydrogen storage volume of the second tank V2 is set to 79% of V1 and the hydrogen storage volume of the third tank V3 is set to 36% of V1. That is, the hydrogen storage volumes of the second and the third tank V2 and V3 are expressed by the following equations respectively:

$$V2=0.79V1$$

$$V3=0.36V1.$$

Then, the ratio "r1" of the remaining amount of hydrogen (i.e., the ratio of the remaining amount of hydrogen to the total hydrogen storage volume of the hydrogen gas supply device) at the time of changing the signal of the signal terminal 9 from "F" to "M1", and the ratio "r2" of the remaining amount of hydrogen at the time of changing the signal of the signal terminal 9 from "M1" to "M2" are represented by the following equations respectively:

$$r1=(V1+V2-2 \times V3)/(V1+V2+V3)=0.5$$

$$r2=(V1-V2)/(V1+V2+V3)=0.10.$$

This makes it possible to detect that the remaining amount of hydrogen falls to 50% or less and 10% or less of the total hydrogen storage volume through the output signal from the signal terminal 9.

Embodiment 3

While the sensors 3 and 12 for detecting the remaining amount of hydrogen in the fuel tanks in the first embodiment are in direct contact with the tanks 2 and 13 to be integrated therewith, the sensors in the third embodiment are provided on a device independently of the tank.

Figure 6:
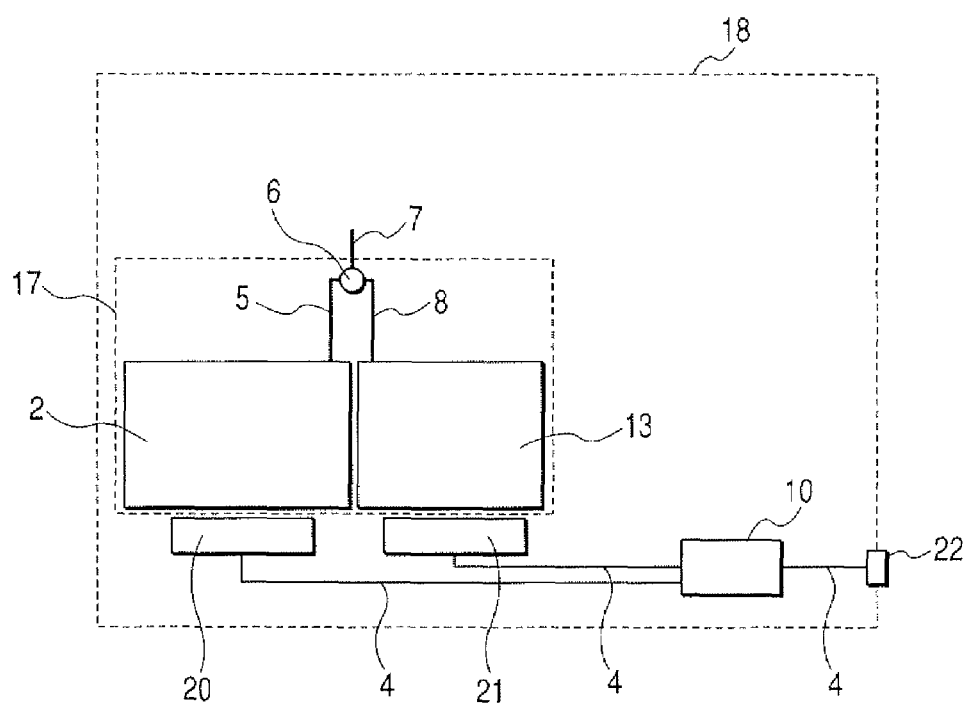
FIG. 6 is a block diagram showing the constitution of a hydrogen gas supply and an external apparatus incorporating the hydrogen gas supply device of a third embodiment according to the present invention.

FIG. 6 is a block diagram showing the constitution of an external apparatus incorporating a hydrogen gas supply device in the third embodiment of the present invention. In the figure, the same constitutional elements as those in the first embodiment are given the same reference numerals to omit duplicated descriptions thereof.

In the figure, reference numeral 17 denotes a hydrogen gas supply device in the third embodiment and 18 denotes an external apparatus incorporating the hydrogen gas supply device. Reference numerals 2 and 13 denote two tanks (i.e., a first and a second tank) different from each other in hydrogen storage volume and the respective hydrogen storage volumes are set to V1 and V2, where V1>V2, similar to the first embodiment.

Reference numeral 20 denotes a first sensor, which is a detecting device for detecting the physical quantity of the first tank 2. Reference numeral 21 denotes a second sensor, which is a detecting device for detecting the physical quantity of the second tank 13. Both sensors are attached to the external device 18. A determination is made whether hydrogen is supplied or not from the tanks (hydrogen supply status) based on the physical quantity of the first and the second tank 2 and 13. Methods of detecting a hydrogen supply status in the tanks 2 and 13 by use of the sensor include a method of measuring a change in the temperature of the storage alloy caused by releasing hydrogen from the tank via a surface temperature of the tank and a method of measuring a change in electric conductivity inside the tank caused by releasing hydrogen from the tank via the surface of the tank. The physical quantity may be detected by any other method, which enables at least a determination that hydrogen in the tank is released and the hydrogen supply is stopped.

Both sensors 20 and 21 are arranged in a position suitable to measure the physical quantity in the tanks.

Reference numeral 10 represents a control device arranged in the external apparatus, which determines the remaining amount of hydrogen in each tank based on the signals from the sensors 20 and 21, changes the indication of an indication lamp 22 based on the determination, and displays the remaining amount of hydrogen.

Figure 7:
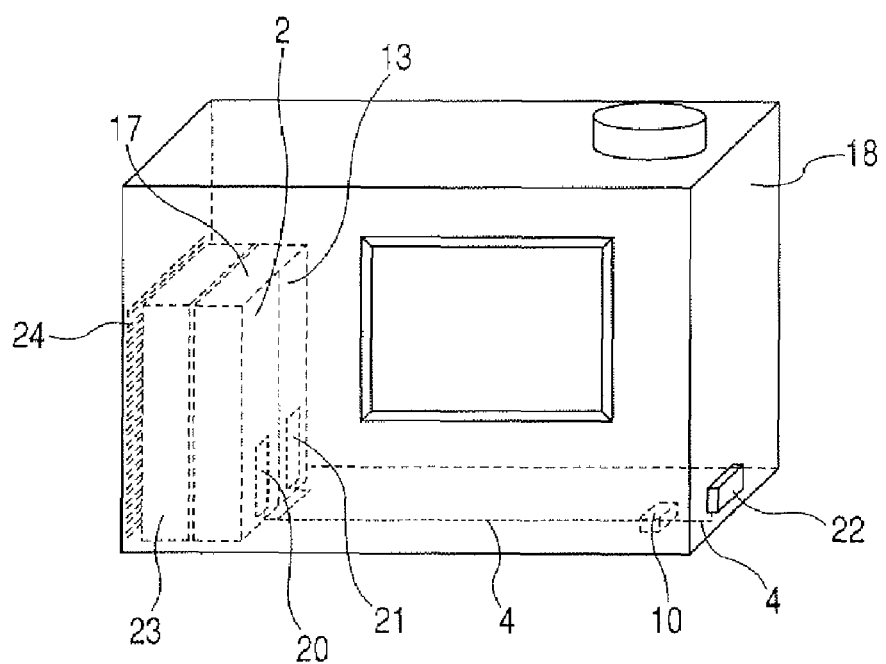
FIG. 7 is a schematic perspective view for describing the appearance of the hydrogen gas supply device and the external apparatus in the third embodiment of the present invention.
Figure 8:
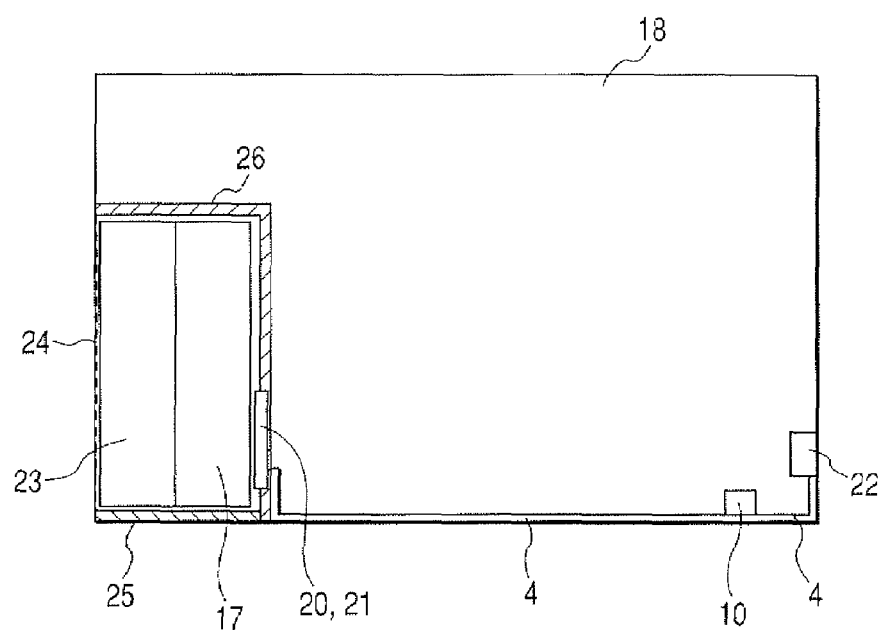
FIG. 8 is a schematic cross section for describing the hydrogen gas supply device and the external apparatus in the third embodiment of the present invention.

FIG. 7 is a schematic perspective view for describing the appearance of the hydrogen gas supply device and the external apparatus in the third embodiment. FIG. 8 is a schematic cross section for describing the hydrogen gas supply device and the external apparatus in the third embodiment. In the present embodiment, there is described the operation of an external apparatus (digital camera) by a fuel cell system produced by combining the hydrogen gas supply device with a fuel cell part.

In the figure, reference numeral 23 denotes a fuel cell part for generating an electric power using hydrogen as a fuel and reference numeral 24 denotes an air vent for taking in air required when the fuel cell part generates electric power. Hydrogen is supplied from the hydrogen gas supply device 17 to the fuel cell part 23 by utilizing conventional techniques, the description of which is omitted. Reference numeral 26 denotes a wall of a fuel cell storage casing for storing the fuel cell system, and reference numeral 25 denotes a door for fitting the fuel cell system to the inside of the external apparatus. As shown in FIG. 8, the sensors 20 and 21 are disposed on the wall 26 of the fuel cell storage casing and are located at a position suitable to detect the remaining amount of hydrogen in corresponding tanks 2 and 13 when the fuel cell system is attached to the external apparatus.

The process of the control device 10 in the third embodiment is the same as that of the control device in the first embodiment, as described in the flow chart (FIG. 3).

In the present embodiment, the sensors for detecting the remaining amount of hydrogen and the control device 10 do not need to be provided with the hydrogen gas supply device, which enables the hydrogen gas supply device to be produced at a low cost.

Embodiment 4

In the first to the third embodiments, hydrogen was simultaneously supplied from a plurality of hydrogen storage tanks different from each other in hydrogen storage volume to determine the remaining amount of hydrogen from the difference in timing when hydrogen in each hydrogen storage tank is completely exhausted.

The plurality of the hydrogen tanks are not always integrally produced to perform the present invention. If separate tanks are used, tanks different in size are required. If so, there is no interchangeability between the tanks, which makes the use inconvenient.

Figure 9:
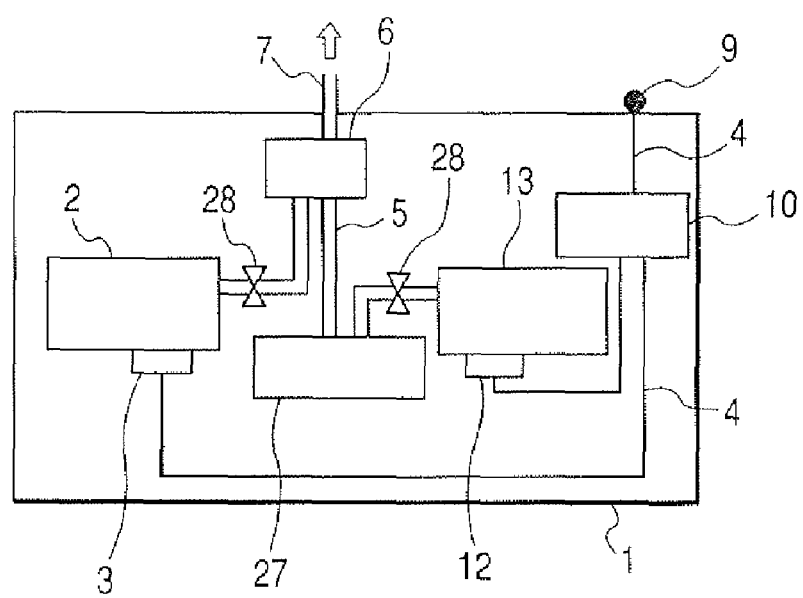
FIG. 9 is a block diagram showing the constitution of a hydrogen gas supply device of a fourth embodiment according to the present invention.

In the fourth embodiment, there is described a hydrogen gas supply device for detecting the remaining amount of hydrogen using two tanks with the same hydrogen storage volume. FIG. 9 is a block diagram showing the constitution of a hydrogen gas supply device of the fourth embodiment. In the figure, the same constitutional elements as those in the first embodiment are given the same reference numerals to omit duplicated descriptions thereof. Reference numerals 2 and 13 indicate a first and a second tank for storing hydrogen, respectively. Both tanks store hydrogen while using a hydrogen storage alloy and are equal in tank size and in hydrogen storage volume to each other. Each tank is formed so as to be attachable to and detachable from the hydrogen gas supply device with a hydrogen tank attachment device 28. Reference numerals 3 and 12 indicate sensors for detecting the physical quantity of the tanks 2 and 13, respectively, and have a function of detecting the remaining amount from the surfaces of the tanks so that the tanks are attachable to and detachable from the supply device. A determination is made whether hydrogen is supplied from each tank (hydrogen supply status) based on the physical quantity. Methods of detecting a hydrogen supply status in the tanks 2 and 13 by use of the sensors include a method of measuring a change in the temperature of the storage alloy caused by releasing hydrogen from the tank via the surface temperature of the tank and a method of measuring a change in electric conductivity inside the tank caused by releasing hydrogen from the tank via the surface of the tank. The physical quantity may be detected by any other method that enables at least determining that hydrogen in the tank is released and the hydrogen supply is stopped.

Reference numeral 27 denotes a storage tank for storing a part of the hydrogen stored in the second tank and is formed so as to communicate with the second tank through a gas supply tube when the second tank is attached to the hydrogen gas supply device. The function of the storage tank is discussed in detail when the flow chart is described in FIG. 12. The storage tank may be filled with a hydrogen storage alloy in order to efficiently store hydrogen in a small tank. However, the hydrogen release pressure inside the storage tank, which is caused by absorbing hydrogen, is set to be smaller than that of each of the tanks 2 and 13 under the same conditions.

Figure 10:
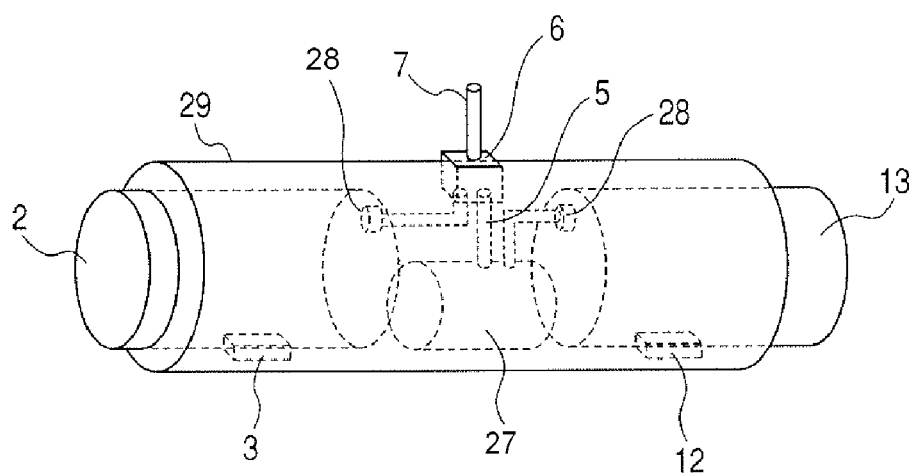
FIG. 10 is a schematic perspective view for describing the appearance of the hydrogen gas supply device in the fourth embodiment according to the present invention.

FIG. 10 is a schematic perspective view for describing the appearance of the hydrogen gas supply device in the fourth embodiment. In the figure, reference numeral 29 denotes a casing of the hydrogen gas supply device. The control device 10 is arranged in a proper place inside the casing of the hydrogen supply device and omitted from FIG. 10.

Figure 11:
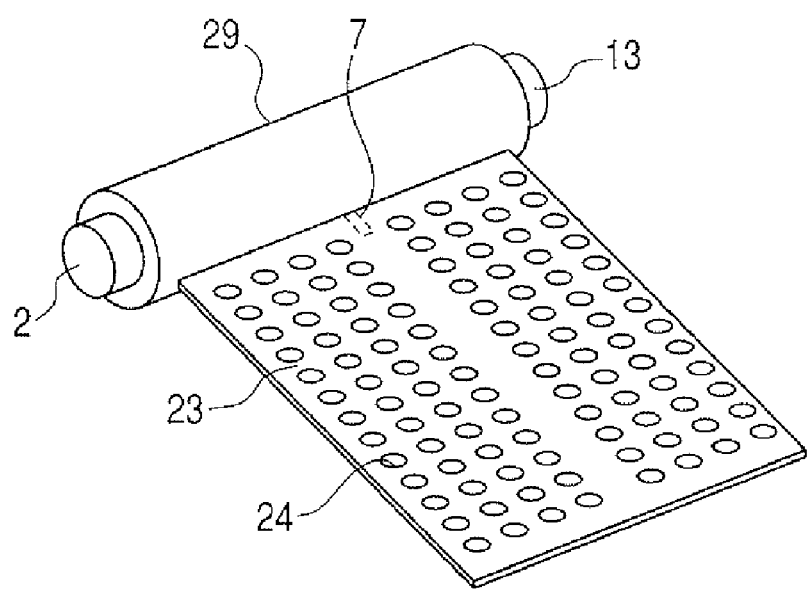
FIG. 11 is a schematic perspective view for describing a fuel cell apparatus using the hydrogen gas supply device in the fourth embodiment according to the present invention.

FIG. 11 is a schematic perspective view for describing the fuel cell system using the hydrogen gas supply device in the fourth embodiment. In the figure, reference numeral 23 indicates a cell unit part of the fuel cell for generating an electric power by using hydrogen supplied from the gas supply tube 7.

FIG. 12 is a flow chart for describing the operation of the control device 10 in the fourth embodiment.

Before the hydrogen gas supply device starts to be used, the storage tank 27 is not filled with hydrogen. The tanks 2 and 13 are filled with hydrogen in advance to such an extent that hydrogen reaches a predetermined full-amount level and are then attached to the hydrogen gas supply device. The amount of hydrogen stored in one tank when it is filled up is set to V1.

When the tanks are attached to the hydrogen gas supply device, a part of hydrogen inside the second tank is moved to the storage tank because the second tank is in communication with the storage tank. Thereby, the remaining amount of hydrogen stored in the second tank is decreased by an amount that is moved from the second tank. In this case, the storage tank may be filled with a hydrogen storage alloy in advance to increase the hydrogen storage volume. In the case of filling the storage tank with a hydrogen storage alloy, the storage tank uses a hydrogen storage alloy smaller in hydrogen release pressure than that used in the second tank as described above, so that a part of hydrogen in the second tank is absorbed into the hydrogen storage alloy in the storage tank when the second tank is in communication with the storage tank.

When the amount of hydrogen stored in the storage tank is set to W and the amount of hydrogen left in the second tank after a part of stored hydrogen has been moved to the storage tank is set to V2, the amount V2 can be expressed by the following equation:

$$V2=V1-W.$$

When the hydrogen gas supply device starts to be used, first the control device 10 outputs a signal "F" indicating that the remaining amount of hydrogen in the hydrogen gas supply device is sufficient to the signal terminal 9 (Step S21). Secondly, the control device determines the hydrogen supply status of the tanks 2 and 13 based on the value of each sensor (Step S22). When hydrogen in the hydrogen gas supply device continues to be used, hydrogen in the second tank having a hydrogen storage volume smaller than that of the first tank is exhausted early in comparison with the first tank. The second tank is in communication with the storage tank 27, and however hydrogen is stored in the storage tank 27 immediately before hydrogen release pressure in the second tank decreases to completely exhaust hydrogen. When the second tank stops supplying hydrogen in Step S22 (in the case of "YES"), the control device outputs the signal "M" signifying that the remaining amount of hydrogen falls to a predetermined value or less to the signal terminal 9 (Step S23).

When the output signal is changed to "M," the remaining amount V of hydrogen in the storage device is expressed by the following equation:

$$V=2V1-2V2=2W,$$

from which it is shown that the remaining amount of hydrogen is equal to 2W or less.

At this point, the ratio "r" of the remaining amount of hydrogen (i.e., the ratio of the remaining amount of hydrogen to the total hydrogen storage volume of the hydrogen gas supply device) is represented by the following equation:

$$r=2W/2V1=W/V1.$$

Therefore, by adjusting the hydrogen storage volumes of the tank and the storage tank, it is possible to change the output signal from "F" to "M" when the remaining amount of hydrogen falls to a desired value or less, thereby detecting that the desired remaining amount of hydrogen falls to the desired value or less.

For instance, in order to detect that the remaining amount of hydrogen falls to 10% or less of the hydrogen storage volume in the hydrogen gas supply device, the hydrogen storage volume W of the storage tank may be set to 10% of the hydrogen storage volume V1 of the first tank, that is, as expressed by the following equation:

$$W=0.1\times V1.$$

At this point, ratio "r" of the remaining amount of hydrogen at the time of changing the output signal from "F" to "M" is expressed by the following equation:

$$r=W/V1=0.1,$$

which indicates that the output signal is changed to "M" when the remaining amount of hydrogen falls to 10% of the hydrogen storage volume.

The hydrogen gas supply device of the present invention is simple in structure and capable of detecting that the remaining amount of hydrogen has fallen to a desired value or less, so that it can be used for the fuel tank of the fuel cell and other devices.

This application claims priority from Japanese Patent Application No. 2005-265791, filed Sep. 13, 2005, which is hereby incorporated by reference herein.

The invention claimed is:

1. A hydrogen gas supply device comprising:
a plurality of tanks each filled with a hydrogen storage alloy for storing a hydrogen gas, at least one tank of the plurality of tanks being different from the other tanks in a hydrogen gas storage volume;
an information obtaining device for obtaining information on a physical quantity of the plurality of tanks including tanks different from each other in the hydrogen gas storage volume; and
a signal outputting device for outputting information signal on a remaining amount of a hydrogen gas in the tanks by determining a hydrogen gas storage status of the plurality of tanks from information on the physical quantity, and detecting decrease of the remaining amount of the hydrogen gas in all tanks in use to a predetermined value or less from the hydrogen gas storage status of the plurality of tanks.

2. The hydrogen gas supply device according to claim 1, wherein the decrease of the remaining amount of the hydrogen gas in all tanks to the predetermined value or less is detected from a difference between a physical quantity of one tank having a small hydrogen gas storage volume and each physical quantity of the other tanks among the plurality of tanks.

3. The hydrogen gas supply device according to claim 1, wherein the information on the physical quantity is information on at least one selected from the group consisting of a tank temperature, a pressure inside the tank, and an electric conductivity inside the tank.

4. A hydrogen gas supply device comprising:
a plurality of tanks each filled with a hydrogen storage alloy for storing a hydrogen gas, at least one tank of the plurality of tanks having the same hydrogen gas storage volume being connected to a downstream storage tank having a hydrogen gas storage volume smaller than a hydrogen gas storage volume of the at least one tank;
an information obtaining device for obtaining information on a physical quantity of the plurality of tanks including the at least one tank connected to the downstream storage tank having a hydrogen gas storage volume smaller than a hydrogen gas storage volume of the at least one tank and a tank not connected to the downstream tank; and a signal outputting device for outputting information signal on a remaining amount of a hydrogen gas of the tanks by determining a hydrogen gas storage status from information on the physical quantity, and detecting decrease of the remaining amount of a hydrogen gas in all tanks in use to a predetermined value or less from the hydrogen gas storage status of the plurality of tanks.

5. The hydrogen gas supply device according to claim 4, wherein the information on the physical quantity is information on at least one selected from the group consisting of a tank temperature, a pressure inside the tank, and an electric conductivity inside the tank.

6. A fuel cell apparatus comprising;
a hydrogen gas supply device according to claim 1; and
a fuel cell for generating an electric power by using hydrogen gas supplied from the hydrogen gas supply device as a fuel.

7. A fuel cell apparatus comprising;
a hydrogen gas supply device according to claim 4; and
a fuel cell for generating an electric power by using hydrogen gas supplied from the hydrogen gas supply device as a fuel.

* * * * *